Sept. 4, 1956 H. F. GEORGE 2,761,691
GOLF CART

Filed April 15, 1954 2 Sheets-Sheet 1

INVENTOR.
Harold F. George
BY
Hamilton & Hamilton
Attorneys.

Sept. 4, 1956  H. F. GEORGE  2,761,691
GOLF CART
Filed April 15, 1954  2 Sheets-Sheet 2
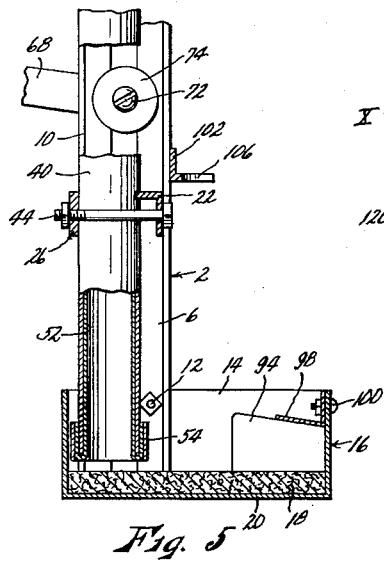
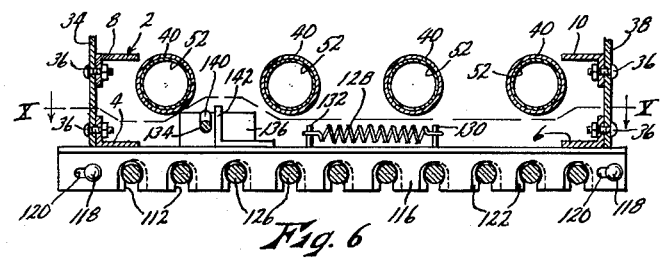
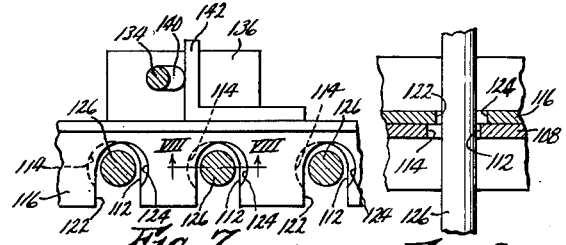
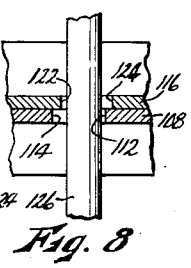
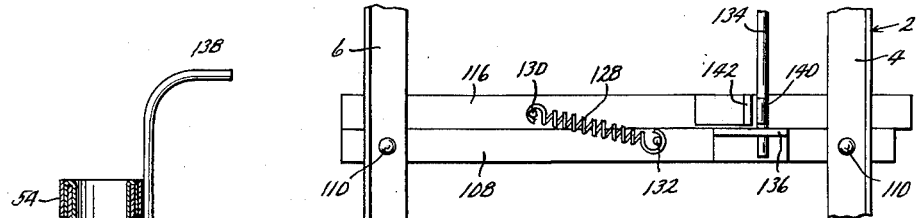
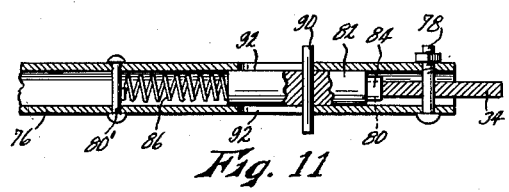
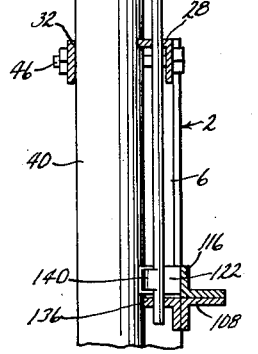
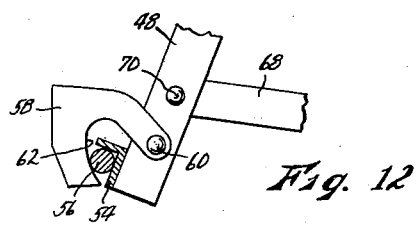
INVENTOR.
Harold F. George
BY Hamilton & Hamilton
Attorneys.

United States Patent Office

2,761,691
Patented Sept. 4, 1956

2,761,691

GOLF CART

Harold F. George, Oak Grove, Mo.

Application April 15, 1954, Serial No. 423,430

2 Claims. (Cl. 280—47.19)

This invention relates to new and useful improvements in article-carrying devices, and has particular reference to a wheeled cart for carrying golf clubs.

An important object of the present invention is the provision of a cart adapted to hold each club in a separate compartment, completely out of contact with any other club.

Another important object is the provision, in a golf cart of the character described, of means whereby each club is securely held against accidental removal or jostling from the cart, and prevented from rattling, but which permits the clubs to be released and removed from the cart very easily and conveniently.

Another object is the provision of a golf cart which may conveniently be folded or collapsed to occupy a minimum of space, thereby providing for easy transportation in automobile luggage compartments or the like.

Other objects are simplicity and economy of construction, dependability and efficiency of operation, and the provision of easy access to any individual club.

With these objects in view, as well as other objects which will appear in the course of the specification, reference will be had to the drawing, wherein:

Fig. 5 is an enlarged, fragmentary sectional view taken on line V—V of Fig. 3, with parts broken away.

Fig. 6 is an enlarged sectional view taken on line VI—VI of Fig. 1, showing the shanks of golf clubs therein and operatively engaged by the latch bar.

Fig. 7 is an enlarged fragmentary view similar to Fig. 6, showing the latch bar operated to release the golf clubs.

Fig. 8 is a fragmentary sectional view taken on line VIII—VIII of Fig. 7.

Fig. 9 is an enlarged fragmentary sectional view taken on line IX—IX of Fig. 2, with parts broken away.

Fig. 10 is a fragmentary sectional view taken on line X—X of Fig. 6.

Fig. 11 is an enlarged fragmentary sectional view taken on line XI—XI of Fig. 1, partially broken away.

Fig. 12 is an enlarged fragmentary sectional view taken on line XII—XII of Fig. 3.

Figures 1, 2:
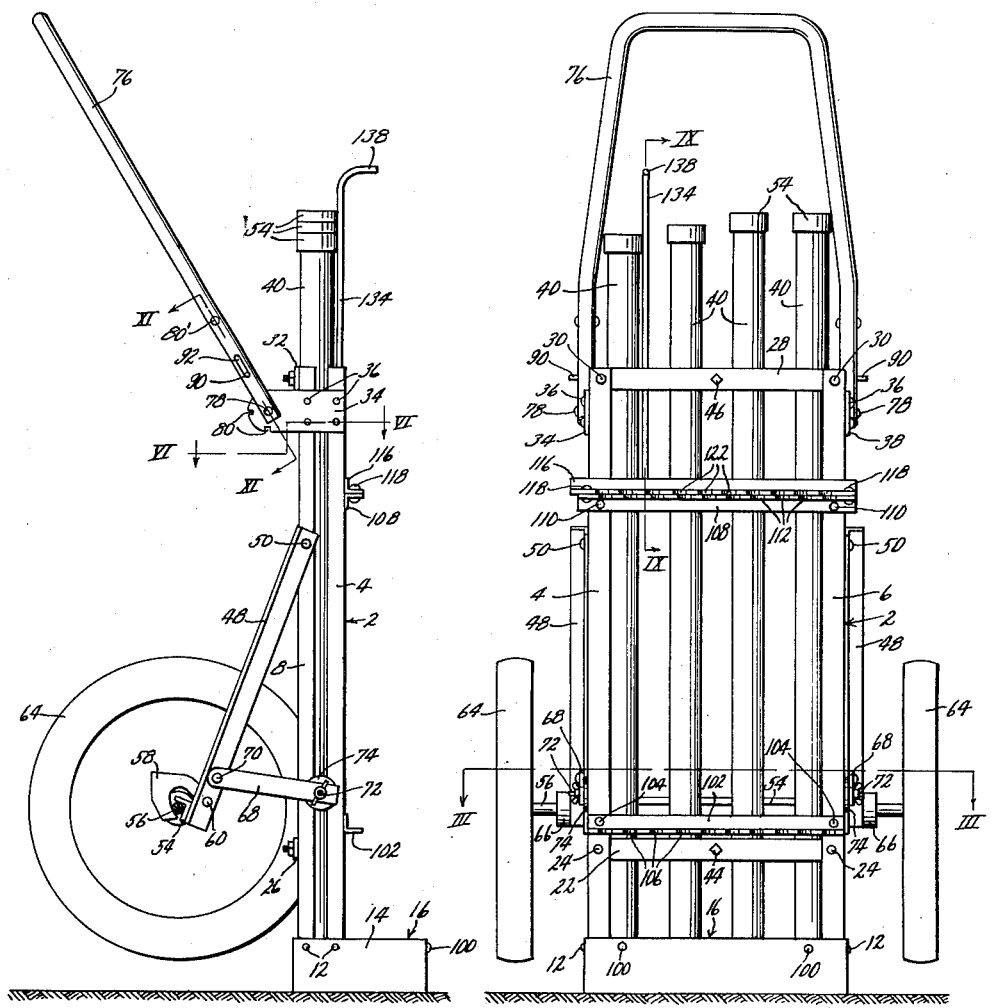
Fig. 1 is a side elevational view of a golf cart embodying the present invention, with one of the wheels broken away.
Fig. 2 is a front elevational view of the golf cart as shown in Fig. 1.

Like reference numerals apply to similar parts throughout the several views, and the numeral 2 applies to a frame or body which extends vertically as shown, and which is rectangular in cross-section, and which is formed in skeleton by four inwardly facing angle irons disposed at the corners thereof, the front angle irons being designated respectively by the numerals 4 and 6, and the rear angle irons by the numerals 8 and 10. At their lower ends the angle irons are affixed as by bolts 12 to the inner sides of the side walls 14 of an open-topped, rectangular tray 16, said tray extending forwardly from frame 2. A mat 18 of fiber or other resilient, yieldable material covers the floor 20 of the tray.

Figures 3, 4:
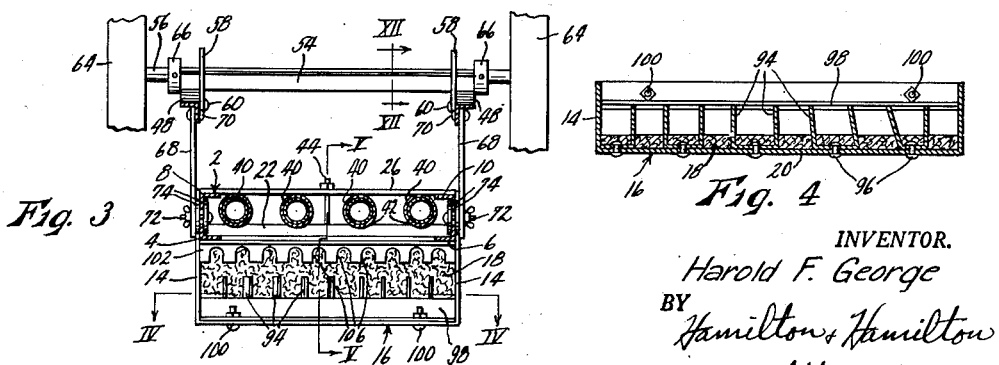
Fig. 3 is a sectional view taken on line III—III of Fig. 2, with the wheels left in elevation and partially broken away.
Fig. 4 is an enlarged sectional view taken on line IV—IV of Fig. 3.

Just above tray 16, an angle-iron bar 22 extends horizontally between and is secured at its ends to front members 6 and 8, as by screws 24 (Fig. 2). A bar 26 extends horizontally between and is fixed at its ends to rear corner members 8 and 10, at the same elevation as bar 22. At the extreme top of frame 2, there is provided also an angle iron bar 28 secured to corner members 4 and 6 by screws 30, and a bar 32 secured to rear corner members 8 and 10, in the same manner as bars 22 and 26. Also adjacent the top of frame 2, a plate 34 is laid against one side of the frame, being secured to front corner member 4 and rear corner member 8 by bolts 36. A similar plate 38 is likewise secured to the corner members 6 and 10 at the opposite side of the frame. A plurality of tubes 40 are disposed vertically in frame 2, the upper portions thereof being gripped between bars 28 and 32, and the lower portions thereof being gripped between bars 22 and 26. As indicated in Fig. 3, the rearwardly extending legs of angle irons 22 and 28 are provided with arcuate notches 42 for receiving the tubes to retain their lateral spacing. Bars 22 and 26, and also bars 28 and 32, may be sprung resiliently apart to permit removal and replacement of the tubes. Bars 22 and 26 are connected centrally between their ends by a bolt 44 (see Figs. 2 and 5) whereby said bars may be drawn together to grip the tubes firmly, and bars 28 and 32 are similarly connected by a bolt 46. Each tube is adapted to carry the shank portion of a "wood" golf club, with the head of the club above the upper end of the tube. The club handle rests on mat 18 in tray 16. Each tube is provided with a cloth lining tube 52, as best shown in Figs. 5, 6 and 9, for preventing rattling of the club handle and also preventing marring of said handle. The ends of the liner are turned outwardly over the outside of tube 40, and secured by binding tape 54.

A pair of arms 48 are pivoted at their upper ends respectively to rear corner members 8 and 10, the pivots being indicated at 50, and being coaxial on a transverse axis. Said arms normally incline downwardly and rearwardly from the frame, and are connected rigidly at their lower ends by a horizontal, transverse angle iron bar 54, said angle iron opening downwardly and to the rear. A wheel axle 56 is disposed within the angle of bar 54, and is releasably retained therein by a pair of keepers 58 pivoted respectively to arms 48 at 60. As best shown in Fig. 12, each keeper is substantially in the form of a hook adapted to engage the rearward side of axle 56 to retain it in the angle of bar 54. The surface 62 of the hook which engages axle 56 is approximately concentric with pivot 60, whereby lateral force on the axle will not disengage the hooks. When the hooks are manually pivoted upwardly, the axle may be removed. A ground-engaging wheel 64 is rotatably mounted at each end of axle 56. A pair of collars 66 are mounted on axle 56 at each end of bar 54, to prevent longitudinal movement of the axle.

Adjacent the lower end of each arm 48, a link 68 is pivoted thereto at 70, and extends forwardly along the corresponding side of frame 2. At its forward end, each link is provided with a bolt 72 equipped with a wing nut. Said bolt extends through said link, and thence through a pair of washers 74, said washers frictionally engaging the inner and outer surfaces of the flanges of the frame members at that side of the frame. That is, the washers 74 at the right side of the frame engage angle irons 4 and 8, and the washers at the left side of the frame engage angle irons 6 and 10. Thus when bolts 72 are tightened in the positions shown in Fig. 1, links 68 hold arms 48 in their rearwardly inclined position as shown. When bolts 72 are loosened, the forward ends of links 68 may be slid upwardly relative to the frame, thereby permitting the lower ends of arms 48 to pivot forwardly until bar 54 rests against the rearward side of the frame. The overall size of the cart is thereby reduced to facilitate the transportation thereof in automobile luggage compartments or the like. As previously described, wheels 64 and axle 56 may also be removed to further decrease the size of the cart.

Each of the plates 34 and 38, at the upper end of the frame, is extended rearwardly from the frame. A U-shaped tubular handle 76 is carried by said plates, the end portion of each leg of the handle being bifurcated to fit along both sides of one of said plates, and being secured pivotally to said plate by a bolt 78 (see Fig. 11). The rearward ends of plates 34 and 38 are semi-circular, and have notches 80 formed in the edges thereof at angularly spaced intervals. Said notches are releasably engaged by a latch bolt 82 disposed within each of the legs of handle 76, and adapted to slide longitudinally therein. Said bolt is provided at its forward end with a tooth 84 adapted to engage selectively in any one of notches 80. A compression spring 86 is disposed within the handle leg, bearing at one end against the rearward end of bolt 82, and at its opposite end against a stop rivet 80' fixed in the handle, whereby to urge the bolt forwardly to its operative position. A pin 90 fixed transversely in bolt 82 extends outwardly therefrom through longitudinally elongated slots 92 formed in the handle. By pulling this pin rearwardly, the bolt tooth 84 is retracted from notch 80 to permit pivotal movement of the handle. The normal operative position of the handle is shown in Fig. 1, although it is of course apparent that the number of possible positions is limited only by the number of notches 80 in plates 34 and 38. It will be noted also that when the wheel arms 48 are folded forwardly as previously described, the handle may be pivoted to extend vertically downwardly approximately parallel to the frame 2, and secured by latch bolts 82. In this position the handle overlaps the outside of axle bar 54, and thereby prevents arms 48 from pivoting rearwardly accidentally.

It is to be noted that while the drawings show the cart resting vertically on the floor of tray 16, with wheels 64 off of the ground, it will in actual use tilt slightly to the rear, so that wheels 64 and the rearward edge of the tray support the cart.

The "iron" clubs are carried with their heads in tray 16, with their handles disposed in racks mounted on the forward face of the frame 2, in a manner which will now be described. Referring first to Figs. 3, 4 and 5, it will be noted that the forward portion of tray 16 is divided by sheet metal walls 94 into a series of compartments each adapted to receive the toe portion of a club head, to keep said club heads out of contact. Walls 94 are formed by the upstanding legs of U-shaped sheet metal members, secured to the tray floor 20 by rivets 96, as shown in Fig. 4. The walls 94 are generally upright, but may be inclined somewhat as shown to more conveniently accommodate club heads having varying degrees of slope. The mat 18 extends to the front of the tray, the forward edge thereof being slitted to accommodate walls 94. A planar lip 98 extending the full width of the tray is secured to the front wall of the tray by bolts 100, and extends rearwardly to form a cover over the top of the compartments defined by walls 94. This lip is inclined upwardly to the rear. Thus when the toe of a club head is inserted forwardly in any one of the compartments, the sloping lip 98 cams it downwardly against the yieldable mat 18. The club head is thus held securely against rattling, and prevented from moving upwardly.

Just above tray 16, a horizontal angle iron bar 102 extends across the forward face of frame 2, being fixed to frame members 4 and 6 as by screws 104 (Fig. 2). One leg of said angle extends horizontally forwardly, and has a series of spaced apart, forwardly opening notches 106 formed therein. Each of said notches is adapted to receive the shank portion of a golf club the head of which is disposed in one of the compartments of tray 16. Adjacent the upper end of frame 2, another angle iron bar 108 extends horizontally across the forward face of the frame, being secured to frame members 4 and 6 by rivets 110, and the forwardly projecting leg of said angle iron has a plurality of forwardly opening notches 112 formed therein, as best shown in Figs. 6–8, each of said notches corresponding with one of notches 106 in bar 102. The root portion of each notch 112 is notched to the left as viewed in Figs. 7 and 8, and as indicated at 114. Another angle iron bar 116 is disposed for longitudinal sliding movement on top of bar 108, being secured to bar 108 by a pair of rivets 118 which extend thorugh longitudinal slots 120 formed in bar 116 (see Fig. 6). The forwardly projecting leg of angle iron 116 has a series of notches 122 formed therein, each of which cooperates with one of notches 112 in bar 108. The root portion of each notch 122 is notched to the right as viewed in Figs. 6–8, as indicated at 124 in Fig. 7. When notches 112 and 122 are in registry, as shown in Fig. 7, the shank portion 126 of a golf club may be inserted into each corresponding pair of notches, as shown. When bar 116, which may be termed a latch bar, is moved to the left, the club shanks are engaged in the lateral enlargements 114 and 124 of notches 112 and 122, and are thereby secured against removal from the notches, as shown in Fig. 6.

Latch bar 116 is continuously urged toward its latching position by a tension spring 128 secured at one end to a pin 130 fixed in the back of bar 116, and at its other end to a pin 132 fixed in the back of bar 108. Latch bar 116 may be manually moved to the left, to release the club shanks, by a mechanism including a vertical shaft 134 journalled for rotary movement in a bracket 136 fixed to the rearward surface of bar 108, and in bar 28. Said shaft extends above the top of the frame sufficiently to pass above the handles of the clubs supported therein, and is provided at its top with an angled handle portion 138 by means of which it may be turned. Immediately behind latch bar 116, shaft 134 is provided with a fixed lateral enlargement 140 which constitutes a cam. This cam functions when shaft 134 is turned from the position shown in Fig. 7 to the position shown in Fig. 8 to engage and move an abutment member 142 fixed to the rearward face of latch bar 116, whereby the latch bar is moved to the right against the pressure of spring 128 to release the club shanks as previously described.

A club is inserted in the cart by first inserting the toe of the club head into one of the compartments of tray 16 formed by walls 94, with the club shank tilted forwardly. The club shank is then tilted rearwardly until it enters one of notches 106 in bar 102. The club handle is moved still further to the rear, during which movement the club shank pivots about bar 102 as a fulcrum, forcing the toe of the club head forwardly in the tray compartment between the mat 18 and the inclined lip 98, where it is held securely against rattling. This movement is continued until the upper portion of the club shank enters a corresponding pair of notches 112—122 in bars 108 and 116. Shaft 134 is then turned to the position shown in Fig. 6, whereupon latch bar 116 is moved by spring 128 to secure the club shank against forward movement. A club is removed by simply reversing the process.

Although I have shown and described a specific embodiment of my invention, it is readily apparent that numerous minor changes of structure and operation could be made without departing from the spirit of the invention as defined by the scope of the appended claims.

What I claim as new and desire to protect by Letters Patent is:

1. A golf cart comprising a substantially upright wheeled frame, a tray fixed to the lower end of said frame and extending forwardly therefrom, partitions dividing the forward portion of said tray into a series of rearwardly opening compartments spaced laterally across the tray and each adapted to receive therein the head portion of a golf club, a planar lip secured to the forward edge of said tray and extending rearwardly over the forward portions of said compartments, whereby to engage the toe portion of said club heads to prevent upward movement thereof, upper end lower rack bars mounted horizontally across the forward face of said frame above said tray, said rack bars each having a series of forwardly opening notches formed therein corresponding with said tray compartments, corresponding pairs of notches in said rack bars being adapted to receive the shank portion of a golf club therein, a latch bar mounted on said upper rack bar for longitudinal sliding movement transverse to the rack bar notches, said latch bar having a series of forwardly opening notches formed therein corresponding with the rack bar notches, and adapted to register with said rack bar notches at one point in the movement of said latch bar, whereby to admit said golf club shanks therein, the root portions of said rack bar notches and said latch bar notches being enlarged longitudinally of said bars, but in opposite directions, whereby when said latch bar is moved in one direction, said notch enlargements will engage said club shanks to prevent their withdrawal from said notches.

2. A golf cart comprising a substantially upright wheeled frame, a tray fixed to the lower end of said frame and extending forwardly therefrom, partitions dividing the forward portion of said tray into a series of rearwardly opening compartments spaced laterally across the tray and each adapted to receive therein the head portion of a golf club, a planar lip secured to the forward edge of said tray and extending rearwardly over the forward portions of said compartments, whereby to engage the toe portion of said club heads to prevent upward movement thereof, upper end lower rack bars mounted horizontally across the forward face of said frame above said tray, said rack bars each having a series of forwardly opening notches formed therein corresponding with said tray compartments, corresponding pairs of notches in said rack bars being adapted to receive the shank portion of a golf club therein, a latch bar mounted on said upper rack bar for longitudinal sliding movement transverse to the rack bar notches, said latch bar having a series of forwardly opening notches formed therein corresponding with the rack bar notches, and adapted to register with said rack bar notches at one point in the movement of said latch bar, whereby to admit said golf club shanks therein, the root portions of said rack bar notches and said latch bar notches being enlarged longitudinally of said bars, but in opposite directions, whereby when said latch bar is moved in one direction, said notch enlargements will engage said club shanks to prevent their withdrawal from said notches, resilient means urging said latch bar toward its club-shank-engaging position, a cam follower fixed to said latch bar, and a cam carried movably by said frame and manually operable to engage said follower to move said latch bar against said resilient means to release said club shanks.

References Cited in the file of this patent
UNITED STATES PATENTS

| | | |
|---|---|---|
| 2,262,298 | Procter | Nov. 11, 1941 |
| 2,415,392 | Morehouse | Feb. 4, 1947 |
| 2,435,893 | Mall | Feb. 10, 1948 |
| 2,513,020 | Haney | June 27, 1950 |
| 2,533,541 | Warring | Dec. 12, 1950 |
| 2,597,386 | Schmid | May 20, 1952 |
| 2,662,776 | Hurst | Dec. 15, 1953 |
| 2,681,232 | Womack | June 15, 1954 |
| 2,681,810 | Lowinski | June 22, 1954 |